(12) United States Patent
Liu et al.

(10) Patent No.: US 10,274,802 B2
(45) Date of Patent: Apr. 30, 2019

(54) PIXEL STRUCTURE AND DISPLAY PANEL USING SAME

(71) Applicant: AU OPTRONICS CORP., Hsinchu (TW)

(72) Inventors: Wei-Hsun Liu, Hsin-Chu (TW); Kuei-Bai Chen, Hsin-Chu (TW); Tzu-Ying Chen, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 0 days.

(21) Appl. No.: 16/011,806

(22) Filed: Jun. 19, 2018

(65) Prior Publication Data

US 2019/0011787 A1    Jan. 10, 2019

(30) Foreign Application Priority Data

Jul. 10, 2017   (TW) .............................. 106123093 A

(51) Int. Cl.
*G02F 1/1333* (2006.01)
*G02F 1/1343* (2006.01)
*G02F 1/1362* (2006.01)
*G02F 1/1368* (2006.01)

(52) U.S. Cl.
CPC .. *G02F 1/136286* (2013.01); *G02F 1/134309* (2013.01); *G02F 1/1368* (2013.01); *G02F 1/133345* (2013.01)

(58) Field of Classification Search
CPC .............. G02F 1/13306; G02F 1/1343; G02F 1/136286; G02F 1/134309
See application file for complete search history.

(56) References Cited

U.S. PATENT DOCUMENTS

| | | | |
|---|---|---|---|
| 6,980,264 B2 | 12/2005 | Lee et al. | |
| 2005/0018099 A1 | 1/2005 | Su et al. | |
| 2012/0050643 A1 | 3/2012 | Li et al. | |
| 2012/0105777 A1* | 5/2012 | Lee ........................ | H01L 27/124 349/106 |
| 2017/0315414 A1* | 11/2017 | Wang ................ | G02F 1/133707 |
| 2018/0024406 A1 | 1/2018 | Lyul | |

* cited by examiner

*Primary Examiner* — Phu Vu
(74) *Attorney, Agent, or Firm* — WPAT, PC

(57) ABSTRACT

A pixel structure and a display panel using the same are disclosed. The pixel structure includes a first substrate, a scan line, a first pixel, an auxiliary electrode, a data line, and an insulation layer. The scan line is disposed on the first substrate. The first pixel is disposed on the first substrate. The first pixel includes a first pixel electrode and a first active element. The first pixel electrode is electrically connected to the first active element. The auxiliary electrode is disposed on the first substrate. The data line is disposed on the auxiliary electrode. The data line has a slit. The slit at least partially overlaps the auxiliary electrode in a vertical projection direction. The insulation layer is disposed between the data line and the auxiliary electrode.

14 Claims, 6 Drawing Sheets

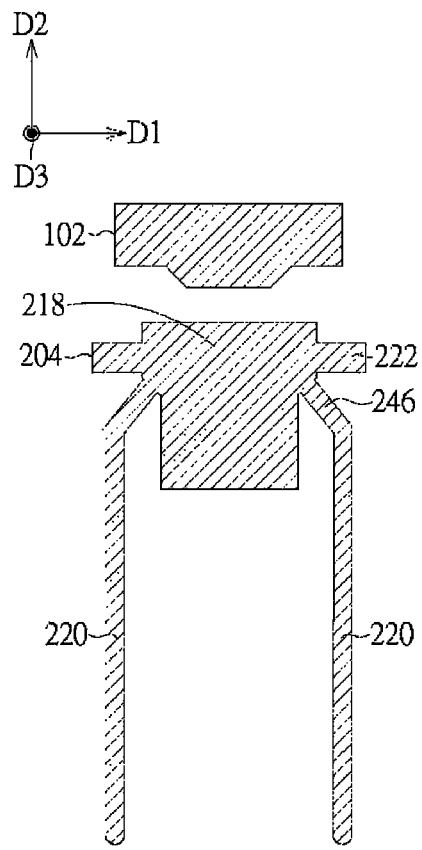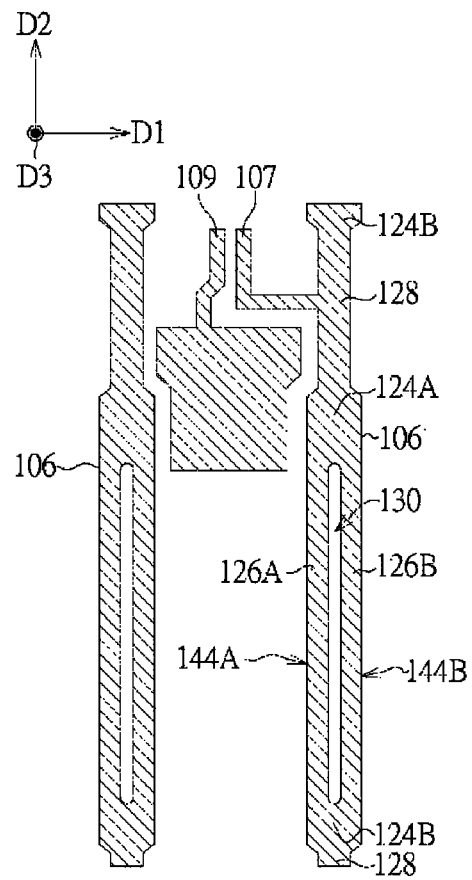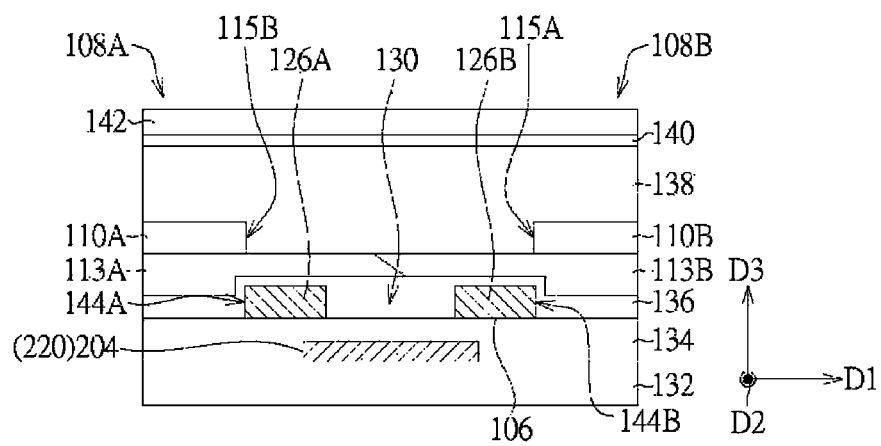

PIXEL STRUCTURE AND DISPLAY PANEL USING SAME

CROSS-REFERENCE TO RELATED APPLICATION

This application claims the priority benefit of Taiwan application serial no. 106123093, filed on Jul. 10, 2017. The entirety of the above-mentioned patent application is hereby incorporated by reference herein and made a part of this specification.

BACKGROUND

Technical Field

The present disclosure relates to a pixel structure and a display panel using the same, and in particular, to a pixel structure and a display panel using the same that can improve display quality.

Related Art

With development of science and technology, people have higher requirements for display panels, and smaller dimensions, high picture quality, and power saving become the trend of the current display panel development. Generally, liquid crystal molecules of a display panel are susceptible to crosstalk interference from a data line, affecting display quality. As a result, problems such as bright and dark light are generated. Therefore, how to improve a crosstalk problem and increase an aperture ratio and transmittance of a display is one of subjects that have been researched in the industry.

SUMMARY

The present disclosure relates to a pixel structure and a display panel using the same, so as to improve display quality of a display device.

According to a first aspect of the present disclosure, a pixel structure is provided. The pixel structure includes a first substrate, a scan line, a first pixel, an auxiliary electrode, a data line, and an insulation layer. The scan line is disposed on the first substrate. The first pixel is disposed on the first substrate. The first pixel includes a first pixel electrode and a first active element. The first pixel electrode is electrically connected to the first active element. The auxiliary electrode is disposed on the first substrate. The data line is disposed on the auxiliary electrode. The data line has a slit. The slit at least partially overlaps the auxiliary electrode in a vertical projection direction. The insulation layer is disposed between the data line and the auxiliary electrode.

A display panel includes a pixel structure, a second substrate, and a display medium layer. The pixel structure includes a first substrate, a scan line, a first pixel, an auxiliary electrode, a data line, and an insulation layer. The scan line is disposed on the first substrate. The first pixel is disposed on the first substrate. The first pixel includes a first pixel electrode and a first active element. The first pixel electrode is electrically connected to the first active element. The auxiliary electrode is disposed on the first substrate. The data line is disposed on the auxiliary electrode. The data line has a slit. The slit at least partially overlaps the auxiliary electrode in a vertical projection direction. The insulation layer is disposed between the data line and the auxiliary electrode. The second substrate is located on an opposite side of the first substrate. The display medium layer is located between the first substrate and the second substrate.

To better understand the aforementioned and other aspects of the present disclosure, embodiments are particularly listed below with reference to the accompanying drawings, which are described in detail below.

BRIEF DESCRIPTION OF THE DRAWINGS

FIG. 6 is a top view of a scan line and an auxiliary electrode according to FIG. 5;

FIG. 7 is a top view of a data line, a source, and a drain according to FIG. 5;

FIG. 8 is a sectional view along a B-B' section line according to FIG. 5;

DETAILED DESCRIPTION

Figure 1:
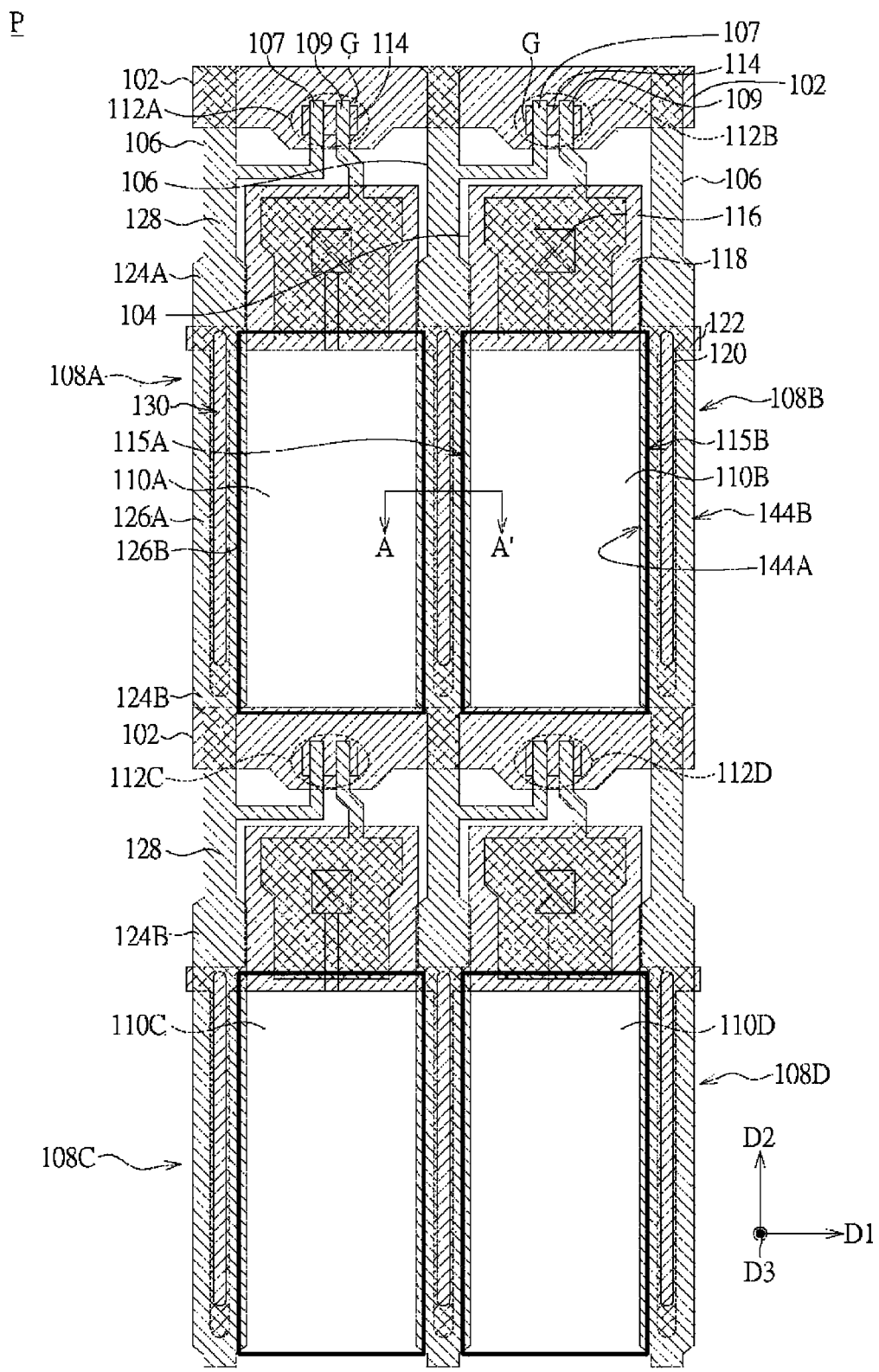
FIG. 1 is a schematic top view of a pixel structure of a display panel according to an embodiment.

The present disclosure will be described more comprehensively below with reference to the accompanying drawings, and exemplary embodiments of the present disclosure are shown in the accompanying drawings. A person skilled in the art may learn that the described embodiments may be modified in various different ways without departing from the spirit or scope of the present disclosure.

In the accompanying drawings, for clear description, the thicknesses of elements and the like are enlarged. In the entire specification, a same reference numeral represents a same element. It should be understood that when an element such as a layer, a film, an area, or a substrate is referred to as being "on another element", "connected to another element", or "overlapping another element", the element may be directly on another element, or may be connected to another element, or an intermediate element may exist. On the contrary, when an element is referred to as being "directly on another element" or "directly connected to another element", there are no intermediate elements. As used herein, "connection" may refer to a physical connection and/or an electrical connection.

It should be understood that although terms such as "first", "second", and "another" herein may be used to describe various elements, components, areas, layers, and/or portions, these elements, components, areas, layers, and/or portions should not be limited by these terms. These terms are merely used to distinguish one element, component, area, layer, or portion from another element, component, area, layer, or portion. Therefore, "a first element", "component", "area", "layer", or "portion" discussed below may be referred to as a second element, component, area, layer, or portion, without departing from the teachings of the present disclosure.

The terms used herein are merely for describing specific embodiments, but are not intended to limit the present disclosure. As used herein, unless being clearly indicated in the content, "a", "one", and "the" in a singular form are intended to include a plural form, and include "at least one". "Or" represents "and/or". As used herein, the term "and/or" includes any and all combinations of one or more related listed items. It should also be understood that when used in this specification, the term "include" and/or "comprise" specifies existence of the features, areas, integrals, steps, operations, elements, and/or components, but does not exclude the existence or adding of one or more other features, areas, integrals, steps, operations, elements, components, and/or combinations thereof.

In addition, relative terms such as "lower", "bottom portion", "upper", or "top portion" may be used herein to describe a relationship between an element and another element, as shown in the figures. It should be understood that the relative terms are intended to include different orientations of devices in addition to the orientations shown in the figures. For example, if a device in a figure is turned over, elements described as being on "lower" sides of other elements would then be reversed to be on "upper" sides of the other elements. Therefore, the exemplary term "below" may include orientations of "below" and "above", and this depends on a particular orientation of the accompanying drawing. Similarly, if a device in a figure is turned over, elements described as being "below" other elements or elements "below" would then be reversed to be "above" the other elements. Therefore, the exemplary term "below" or "below" may include orientations of upper and below.

"Approximately" or "substantially" used herein includes a value and an average value within an acceptable deviation range of particular values determined by a person of ordinary skill in the art. Discussed measurements and a particular quantity (that is, a limitation of a measurement system) of errors related to the measurements are considered. For example, "approximately" may indicate that it is within one or more standard deviations of the value, or within ±30%, ±20%, ±10%, or ±5%.

Unless otherwise defined, all terms used herein (including technical and scientific terms) have same meanings that are generally understood by a person of ordinary skill in the art. It should be further understood that those terms defined in dictionaries that are usually used should be construed to have meanings that are the same as meanings of these terms in the related art and the context of the present disclosure, and should not be construed to have ideal or excessively formal meanings, unless being explicitly defined herein.

Exemplary embodiments are described herein with reference to sectional views that serve as schematic diagrams of ideal embodiments. Therefore, shape changes of figures that serve as results of, for example, manufacturing technologies and/or common differences can be expected. Therefore, the embodiments described herein should not be construed to be limited to specific shapes of the areas shown herein, but include, for example, shape deviations resulted by manufacturing. For example, areas shown or described as flat may usually have rough and/or nonlinear characteristics. In addition, a shown acute angle may be rounded. Therefore, the areas shown in the figures are essentially exemplary, and the shapes thereof are not intended to show the exact shapes of the areas and are not intended to limit the scope of the claims.

Descriptions are provided below by using some embodiments. It should be noted that this disclosure does not show all possible embodiments, and other implementation aspects that are not provided in this disclosure may also be applied. Further, sizes on the figures are not drawn in equal proportion according to actual products. Therefore, content of the specification and the figures is merely for describing the embodiments, and is not intended to limit the protection scope of this disclosure. In addition, descriptions in the embodiments, for example, detailed structures, manufacturing steps, and material applications are merely examples, and not intended to limit the protection scope of this disclosure. Details of steps and structures in the embodiments may be changed and modified according to requirements of actual application processes without departing from the spirit and scope of this disclosure. Same/similar elements are denoted by same/similar symbols below.

Figure 2:
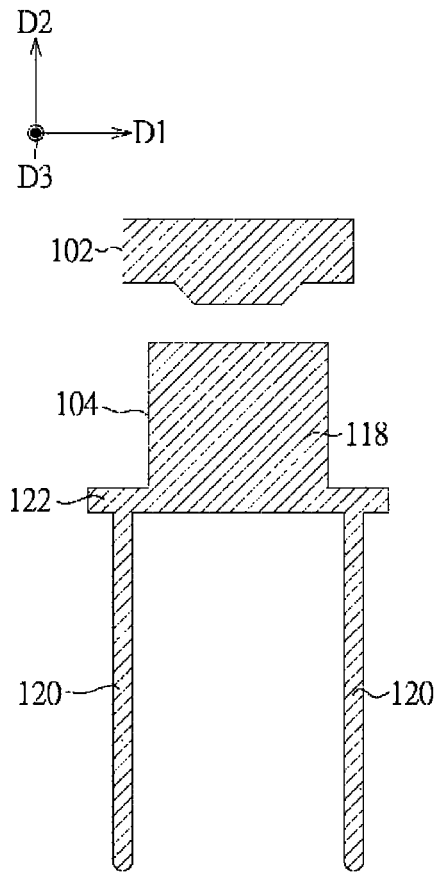
FIG. 2 is a top view of a scan line and an auxiliary electrode according to FIG. 1.
Figure 3:
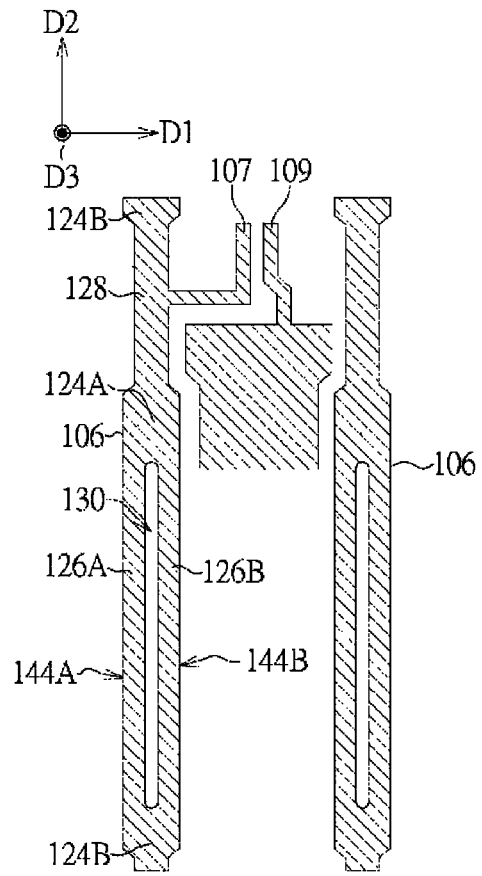
FIG. 3 is a top view of a data line, a source, and a drain according to FIG. 1.
Figure 4:
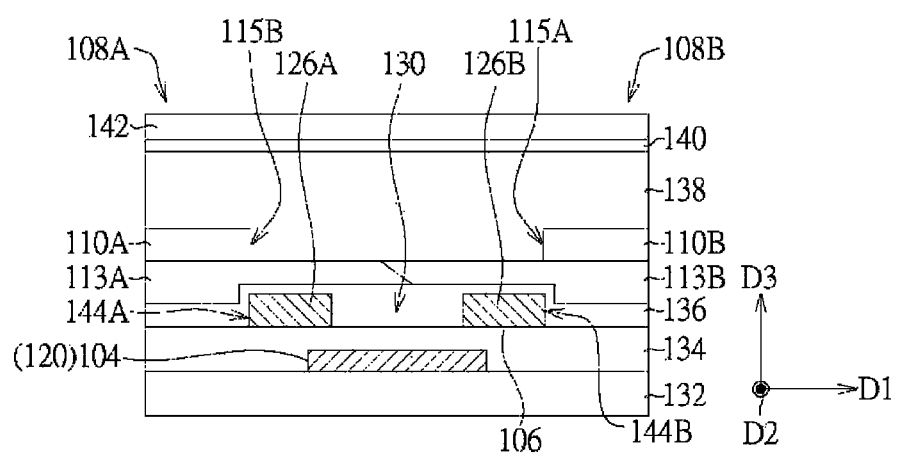
FIG. 4 is a sectional view along an A-A' section line according to FIG. 1.
Figure 5:
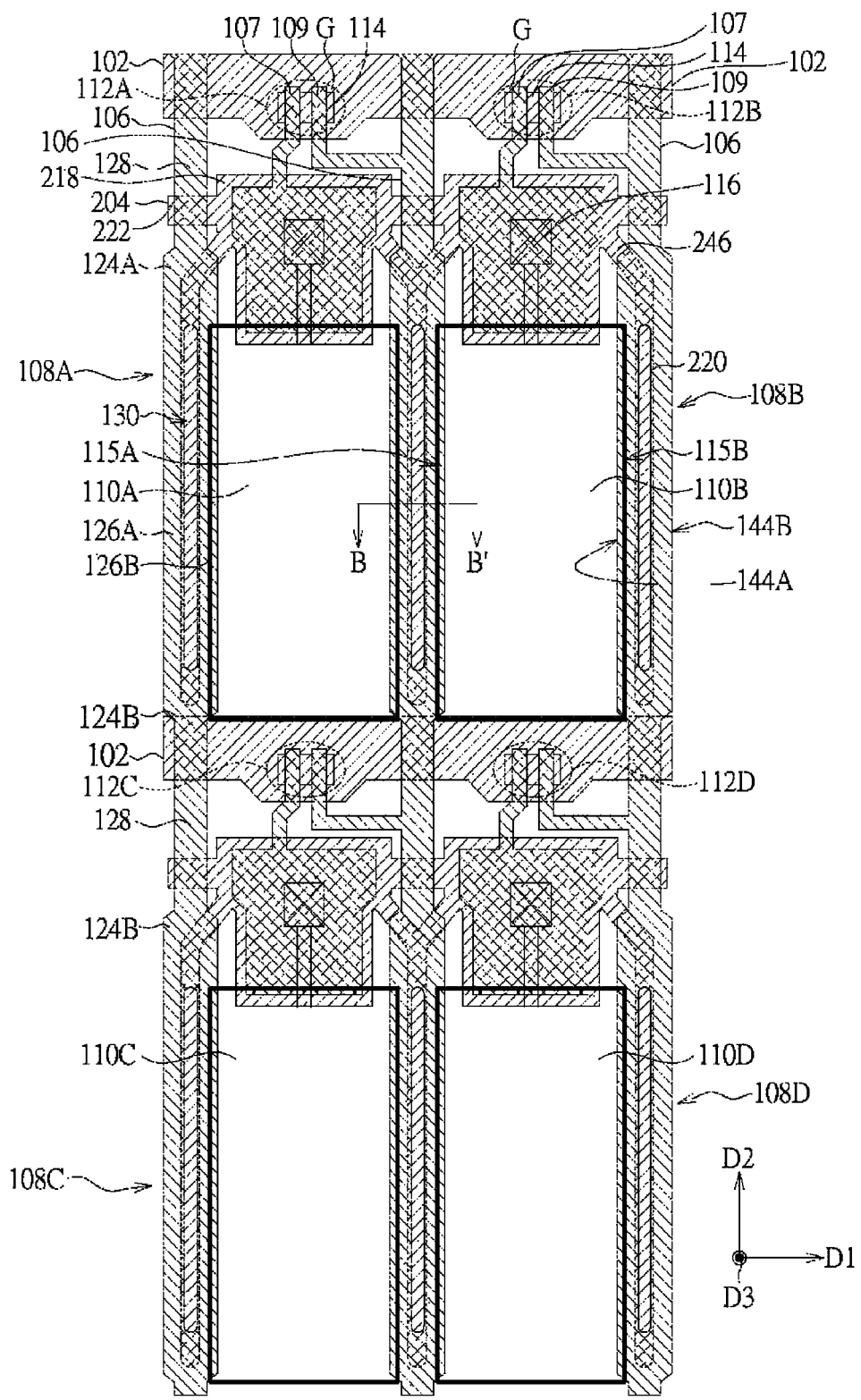
FIG. 5 is a schematic top view of a pixel structure of a display panel according to another embodiment.

Referring to FIG. 1 to FIG. 4, FIG. 1 is a schematic top view of a pixel structure of a display panel according to an embodiment; FIG. 2 is a top view of a scan line and an auxiliary electrode according to FIG. 1; FIG. 3 is a top view of a data line, a source electrode, and a drain electrode according to FIG. 1; and FIG. 4 is a sectional view along an A-A' section line according to FIG. 1. Referring to FIG. 1 and FIG. 4, a pixel structure P includes a first substrate 132; scan lines 102; pixels 108A, 108B, 108C, and 108D; an auxiliary electrode 104; and data lines 106. The pixels 108A, 108B, 108C, and 108D include pixel electrodes 110A, 110B, 110C, and 110D and active elements 112A, 112B, 112C, and 112D.

Figure 10:
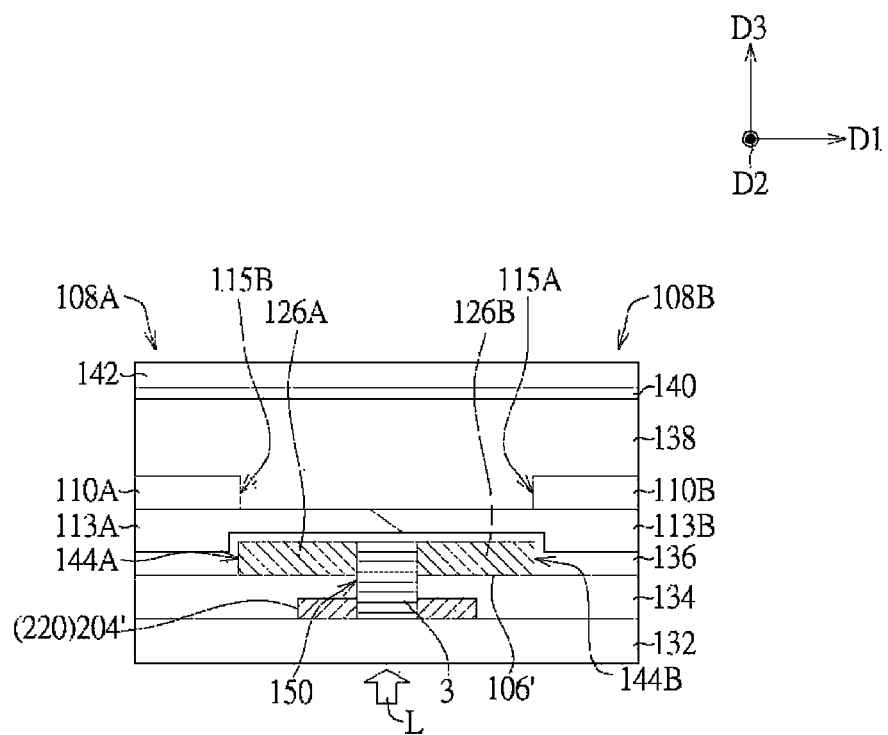
FIG. 10 is a sectional view along a C-C' section line according to FIG. 9.

The pixels 108A, 108B, 108C, and 108D respectively include the corresponding pixel electrodes 110A, 110B, 110C, and 110D and the corresponding active elements 112A, 112B, 112C, and 112D, and the pixel electrodes 110A, 110B, 110C, and 110D are electrically connected to the corresponding active elements 112A, 112B, 112C, and 112D. In some embodiments, the pixels 108A, 108B, 108C, and 108D may also be referred to as sub-pixels 108A, 108B, 108C, and 108D. The pixels 108A, 108B, 108C, and 108D may selectively include color filter (for brevity, only a color filter 113A of the pixel 108A and a color filter 113B of the pixel 108B are shown in FIG. 4, FIG. 8, and FIG. 10, and color filter of the other pixels 108B, 108C, and 108D can be deduced by analogy). Each pixel electrode (for example, using the pixel electrode 110B in FIG. 1 as an example) has at least one side edge (for example, opposite side edges 115A and 115B are marked on the pixel electrode 110B in FIG. 1). In other words, each of the pixel electrodes 110A, 110B, 110C, and 110D has at least one side edge (for example, the opposite side edges 115A and 115B). In some embodiments, the pixel electrode 110A in this example may also be referred to as a first pixel electrode, and a pixel at which the first pixel electrode is located and a corresponding active element may also be referred to as a first pixel and a first active element. The rest can be deduced by analogy. The pixel electrode 110B in this example may also be referred to as a second pixel electrode, and a pixel at which the second pixel electrode is located and a corresponding active element may also be referred to as a second pixel and a second active element. In FIG. 1 of this embodiment, four pixels are divided. However, in some embodiments, at least one pixel may also be used in the embodiments of this disclosure. In an embodiment, the pixel 108A, the pixel 108B, the pixel 108C, and the pixel 108D may be defined by the scan line 102 that substantially extends along a first direction D1 and the data line 106 that substantially extends along a second direction D2. In some embodiments, the pixel 108A, the pixel 108B, the pixel 108C, and the pixel 108D may be respectively defined by areas in which the pixel electrodes 110A, 110B, 110C, and 110D and the corresponding active elements 112A, 112B, 112C, and 112D are located, but are not defined by the data line 106 and the scan line 102. The first direction D1 may cross (for example, be substantially vertical to) the second direction D2, but is not limited thereto. For example, the first direction D1 may be an X direction, and the second direction D2 may be a Y direction. The data line 106 may substantially extend along the first direction D1, and may be disposed between corresponding pixels. For example, the data line 106 in the middle of FIG. 1 is between the pixel 108A and the pixel 108B and is between the pixel 108C and the pixel 108D. The scan line 102 may substantially extend along the second direction D2, and may be disposed between corresponding pixels. For example, the scan line 102 in the middle of FIG. 1 is between the pixel 108A and the pixel 108C and is between the pixel 108B and the pixel 108D, but is not limited thereto. In other embodiments, the data line 106 may substantially extend along the second direction D2, and the scan line 102 may substantially extend along the first direction D1. Moreover, the data line 106 and the scan line 102 may be disposed between corresponding pixels, for example, between the pixel 108A and the pixel 108B and between the pixel 108C and the pixel 108D. Although the pixels in a form of vertical pixels are used as examples in this embodiment, but the pixels not limited thereto. In other embodiments, the pixels may also be in a form of horizontal pixels.

The active elements 112A, 112B, 112C, and 112D each include a source electrode 107, a drain electrode 109, a gate electrode G, and a channel layer 114. Only detailed denotations of the active elements 112A and 112B are shown in FIG. 1, and the rest can be deduced by analogy to simplify the active elements 112C and 112D. The channel layer 114 of each active element is located between the source electrode 107 and the drain electrode 109 and the gate electrode G, and the gate electrode G of each active element is electrically connected to the scan line 102. The drain electrode 109 of each active element is electrically connected to the corresponding pixel electrodes 110A, 110B, 110C, and 110D. In some embodiments, the drain electrode 109 of each active element may be electrically connected to the corresponding pixel electrodes 110A, 110B, 110C, and 110D through a contact hole 116. The active elements 112A, 112B, 112C, and 112D in this embodiment are described by using a bottom-gate thin film transistor (bottom-gate TFT) as an example, for example, the gate electrode G is located below the channel layer 114, but the present disclosure is not limited thereto. In other embodiments, the active elements 112A, 112B, 112C, and 112D may be top-gate TFTs (for example, the gate electrode G is located above the channel layer 114), or other TFTs of proper types. In addition, the pixel structure P may be selectively provided with a black matrix (BM, not shown) to cover the scan line 102 and the active elements 112A, 112B, 112C, and 112D. In a preferred embodiment, the BM (not shown) is not disposed on the data line 106, so as to increase an aperture ratio of the pixel structure (P), but not limited its.

Referring to FIG. 1 and FIG. 2, the scan line 102 and the auxiliary electrode 104 shown in FIG. 1 and FIG. 2 are separated, and may be formed by a first metal layer (M1). For example, the scan line 102 and the auxiliary electrode 104 may be formed by a same film layer, but are not limited thereto. In other embodiments, the scan line 102 and the auxiliary electrode 104 may be formed by different film layers. The auxiliary electrode 104 has a light shielding effect. In this way, when the BM (not shown) is not disposed on the data line 106, light leakage around the data line 106 can be prevented. In consideration of electrical conductivity, the first metal layer (M1) may be a single-layer structure or a multilayer structure, and usually uses a metal material.

According to other embodiments, the first metal layer (M1) may also use other conductive materials such as an alloy, a nitride of a metal material, an oxide of a metal material, a nitrogen oxide of a metal material, or other proper conductive materials. As shown in FIG. 2, the auxiliary electrode 104 may include a block portion 118, a first extension portion 120, and a second extension portion 122. The second extension portion 122 is connected between the block portion 118 and the first extension portion 120. The second extension portion 122 may substantially extend along the first direction D1, and is connected to block portions 118 of the different pixels 108A, 108B, 108C, and 108D. In some embodiments, the second extension portion 122 may substantially extend along the first direction D1, and is connected to the block portions 118 of the pixels 108A and 108B or is connected to the block portions 118 of the pixels 108C and 108D. In other embodiments, the second extension portion 122 may substantially extend along the first direction D1, but is not connected to the block portion 118 of at least one of the other pixels 108B, 108C, or 108D. There may be a plurality of first extension portions 120 that may substantially extend along the second direction D2 separately, and may be located on two side edges 115A and 115B of the pixel electrodes 110A, 110B, 110C, and 110D. For example, the first extension portion 120 is located on the side edge 115B of the pixel electrode 110A of the adjacent pixel 108A, and is located on the side edge 115A of the pixel electrode 110B of the adjacent pixel 108B, as shown in FIG. 4.

As in FIG. 1 and FIG. 3, the data line 106, the source electrode 107, and the drain electrode 109 may be formed by a second metal layer (M2). For example, the data line 106, the source electrode 107, and the drain electrode 109 are formed by a same film layer, but are not limited thereto. In other embodiments, the data line 106, the source electrode 107, and the drain electrode 109 may be formed by different film layers. In consideration of electrical conductivity, the second metal layer (M2) may be a single-layer structure or a multilayer structure, and usually uses a metal material. However, the present disclosure is not limited thereto. According to other embodiments, the second metal layer (M2) may also use other conductive materials such as an alloy, a nitride of a metal material, an oxide of a metal material, a nitrogen oxide of a metal material, or other proper conductive materials. An insulation layer 134 is disposed between the first metal layer (M1) and the second metal layer (M2). In some embodiments, the data line 106 may include wide portions 124A and 124B and narrow portions 126A and 126B. The narrow portions 126A and 126B are between the corresponding side edges 115A and 115B of the pixel electrodes 110A, 110B, 110C, and 110D. The wide portions 124A and 124B are connected to upper and lower ends of the narrow portions 126A and 126B respectively. In other embodiments, the data line 106 may further include a connection portion 128. For example, the connection portion 128 may be disposed between the pixels 108A and 108C, and the connection portion 128 at least partially overlaps the scan line 102 in a third direction D3 (or referred to as a direction that is vertically projected on the first substrate 132). In some embodiments, the connection portion 128 may be connected between the wide portion 124A and the wide portion 124B. In some embodiments, the width of the connection portion 128 (extending along the first direction D1) may be less than the width of the wide portion 124A and the width of the wide portion 124B (extending along the first direction D1). For example, a width range of the connection portion 128 is preferably approximately 5-10 micrometers (um), width ranges of the wide portion 124A and the wide portion 124B are preferably approximately 4-6 um, and width ranges of the narrow portion 126A and the narrow portion 126B are preferably approximately 4-6 um, but the present disclosure is not limited thereto.

The data line 106 may define, by using the wide portion 124A, the wide portion 124B, the narrow portion 126A, and the narrow portion 126B that are connected, a slit 130 that substantially extends along the second direction D2. Alternatively, the wide portion 124A, the wide portion 124B, the narrow portion 126A, and the narrow portion 126B of the data line 106 surround the slit 130. In an embodiment, the thicknesses of the narrow portion 126A and the narrow portion 126B of the data line 106 (extending along the third direction D3) are greater than the thicknesses of the wide portion 124A and the wide portion 124B (extending along the third direction D3). In this way, total cross-sectional areas of the narrow portion 126A and the narrow portion 126B can be substantially equal to a cross-sectional area of the wide portion 124A, and substantially be equal to a cross-sectional area of the wide portion 124B. Therefore, resistance values per unit length of the narrow portion 126A and the narrow portion 126B are substantially equal to a resistance value per unit length of the wide portion 124A and are equal to a resistance value per unit length of the wide portion 124B. In other words, the data line 106 can have substantially same resistance values per unit length. In an embodiment, for example, thickness ranges of the narrow portion 126A and the narrow portion 126B are approximately 5000-6000 angstroms (Å). Thickness ranges of the wide portion 124A and the wide portion 124B are approximately 3500-5000 Å.

Referring to FIG. 4, FIG. 4 is a sectional view along an A-A' section line according to an embodiment of FIG. 1. The auxiliary electrode 104 is disposed on the first substrate 132. The insulation layer 134 is disposed between the auxiliary electrode 104 and the first substrate 132. The data line 106 is disposed on the insulation layer 134. Each pixel may be selectively provided with a color filter. For example, a portion of the color filter 113A of the pixel 108A and a portion of the color resist 113B of the pixel 108B are disposed on the narrow portion 126A and the narrow portion 126B of the data line 106. In other embodiments, an insulation layer 136 may be further selectively included. A portion of the color resist 113A of the pixel 108A and a portion of the color filter 113B of the pixel 108B are disposed on the narrow portion 126A and the narrow portion 126B of the data line 106, and the insulation layer 136. In some embodiments, a portion of the color filter 113A of the pixel 108A and a portion of the color filter 113B of the pixel 108B cover the slit 130, and are vertically projected on the first substrate 132 to be overlapped. The pixel electrodes such as the pixel electrode 110A and the pixel electrode 110B may be respectively disposed on the color filter 113A and the color filter 113B. However, the color filter 113A and the color filter 113B may also be selectively disposed on an inner surface of a second substrate 142. Therefore, there is no color filters between the pixel electrodes such as the pixel electrode 110A and the pixel electrode 110B and the first substrate. In other embodiments, the inner surface of the second substrate 142 may selectively further include an electrode film 140. For example, a display medium layer 138 is disposed between the first substrate 132 and the second substrate 142 having the electrode film 140 on the inner surface thereof, where the first substrate 132 and the second substrate 142 are disposed opposite to each other. The display medium layer 138 may include, for example, a liquid crystal layer, but is not limited thereto; and may also be another proper display medium layer. In an embodiment, the auxiliary electrode 104 and the electrode film 140 on the second substrate 142 are substantially applied with a same voltage. For example, the electrode film 140 may serve as a common electrode and may be applied with a common voltage or other proper potentials, for example, a floating potential or an adjustable potential. The auxiliary electrode 104 may also be applied with a common voltage or other proper potentials, for example, a floating potential or an adjustable potential. In this example, the auxiliary electrode 104 may also be referred to as an array com electrode, but not limited its.

Referring to FIG. 1 to FIG. 4, in this embodiment, the data line 106 has the slit 130 and the narrow portions 126A and 126B between the corresponding side edges 115A and 115B of the adjacent pixel electrodes 110A, 110B, 110C, and 110D. Because the data line 106 is designed to have the slit 130, parasitic capacitors of the pixel electrodes 110A, 110B, 110C, and 110D and the data line 106 may be reduced. The auxiliary electrode 104 is designed to be disposed below the slit 130 of the data line 106, and partially overlap the narrow portions 126A and 126B. In other words, the auxiliary electrode 104 at least partially overlaps the slit 130 along the third direction D3 (or referred to as the direction that is vertically projected on the first substrate 132). In a preferred embodiment, the auxiliary electrode 104 completely overlaps the slit 130 in the third direction D3. Seen from a direction from the first substrate 132 to the second substrate 142, the auxiliary electrode 104 completely covers the slit 130. Because both the auxiliary electrode 104 and the electrode film 140 are applied with a common voltage, the two have a substantially same potential. Therefore, molecules of the display medium layer 138 above the auxiliary electrode 104, for example, liquid crystal molecules of a liquid crystal layer, particularly vertical alignment (VA) liquid crystal molecules, may be maintained in an original state (for example, the VA liquid crystal molecules are maintained in a state that a long molecular axis is substantially vertical to the first substrate 132). In this way, when the data line 106 (including the narrow portions 126A and 126B) transfers pixel voltages (particularly high-potential voltages) of other pixels, because the auxiliary electrode 104 and the electrode film 140 have the substantially same potential, an arrangement state (for example, an inclination angle of a molecule) of the molecules of the display medium layer 138 (for example, liquid crystal molecules of a liquid crystal layer) is not greatly affected. In this way, a crosstalk phenomenon that is caused by the pixel voltages transferred to other pixels by the data line 106 can be effectively prevented. Therefore, light leakage can be effectively prevented. In addition, the auxiliary electrode 104 is vertically projected to the data line 106 is not out of an outer side surface 144A of the narrow portion 126A and an outer side surface 144B of the narrow portion 126B of the data line 106. Therefore, an aperture ratio of the display panel is not affected. Further, the auxiliary electrode 104 may correspond to a position at which the color filter overlap, for example, a position at which the color filter 113A of the pixel 108A (FIG. 4) overlaps the color filter 113B of the pixel 108B. The first extension portion 120 of the auxiliary electrode 104 may be used as a light shielding element, so as to prevent a problem of light leakage at the position at which the color filter overlap.

Further, according to the design that the data line 106 has the slit 130 and the narrow portions 126A and 126B on the corresponding side edges 115A and 115B of the adjacent pixel electrodes 110A, 110B, 110C, and 110D, and the auxiliary electrode 104 is disposed below the slit 130 of the data line 106 and partially overlaps the narrow portions 126A and 126B, parasitic capacitors of the pixel electrodes 110A, 110B, 110C, and 110D and the data line 106 can be effectively reduced. In addition, a distance between the pixel electrodes of two adjacent pixels can be shortened to increase an aperture ratio or light transmittance of a pixel or resolution of the pixel structure P. For example, a distance between the pixel electrodes 110A and 110B in FIG. 4 may be less than a distance between two adjacent pixel electrodes of a pixel structure that does not has the auxiliary electrode 104. Both the auxiliary electrode 104 and the electrode film 140 are applied with the substantially same potential, for example, a common voltage, so that interference between the pixel electrodes 110A and 110B can be reduced. In addition, the data line 106 has the slit 130, so that parasitic capacitors of the pixel electrodes 110A, 110B, 110C, and 110D and a pixel electrode of the data line 106 are reduced. Further, the distance between the pixel electrode 110A and the pixel electrode 110B can be shortened and a distance between the pixel electrode 110C and the pixel electrode 110D can be shortened, to increase an aperture ratio of the pixel structure and light transmittance or resolution of the display panel.

Referring to FIG. 5 to FIG. 8, FIG. 5 is a schematic top view of a pixel structure of a display panel according to another embodiment; FIG. 6 is a top view of a scan line 102 and an auxiliary electrode 204 according to FIG. 5; FIG. 7 is a top view of a data line 106, a source electrode 107, and a drain electrode 109 according to FIG. 5; and FIG. 8 is a sectional view of the pixel structure along a B-B' line according to FIG. 5.

Most elements in this embodiment are similar to those in the first embodiment, reference may be made to related descriptions and designs in the first embodiment, and details are not described herein again. This embodiment mainly differs from the first embodiment in that: the auxiliary electrode 204 may include a block portion 218, a first extension portion 220, a second extension portion 222, and a linking portion 246. The linking portion (or namely connection portion) 246 may be connected between the block portion 218 and the first extension portion 220 that substantially extends to the second direction D2. The second extension portion 222 may substantially extend along the first direction D1 to be connected between block portions 218 corresponding to different pixels. In some embodiments, the second extension portion 222 may substantially extend along the first direction D1, and may be connected to block portions 218 of the pixels 108A and 108B or be connected to block portions 218 of the pixels 108C and 108D. In other embodiments, the second extension portion 222 may substantially extend along the first direction D1, but is not connected to the block portion 218 of at least one of the other pixels 108B, 108C, or 108D.

This embodiment, similar to the first embodiment, can also effectively prevent a crosstalk phenomenon that is caused by pixel voltages transferred to other pixels by the data line 106, and can also effectively prevent light leakage. Moreover, this embodiment can also increase an aperture ratio or light transmittance of a pixel, and details are not described herein again.

The auxiliary electrode 204 of this embodiment can further be used to repair the data line 106 when the data line 106 has a defect.

Figure 9:
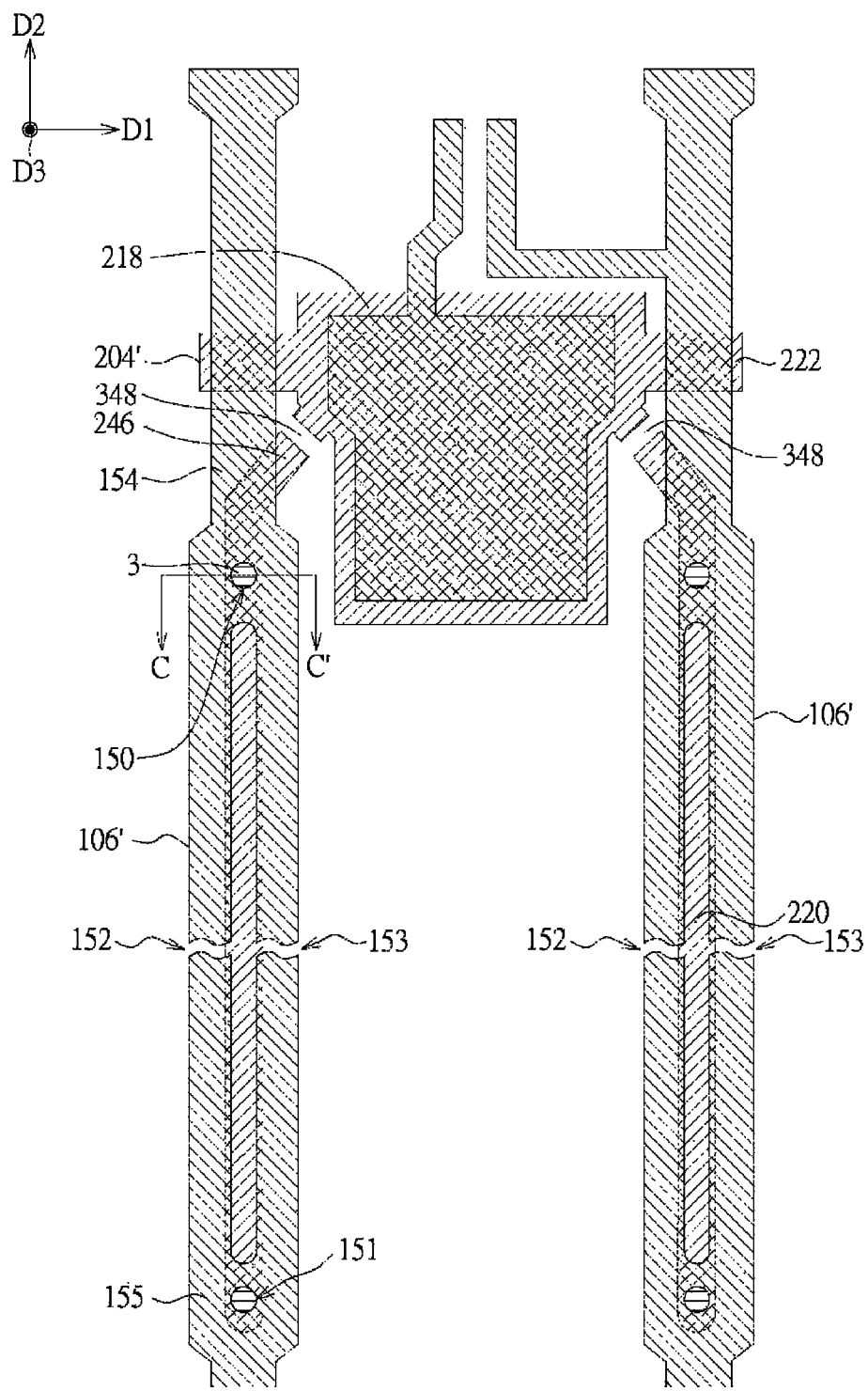
FIG. 9 is a top view of an auxiliary electrode, a data line, a source, and a drain according to another embodiment.

Referring to FIG. 9 and FIG. 10, a top view of FIG. 9 shows a data line 106' and an auxiliary electrode 204'; and FIG. 10 is a sectional view of the pixel structure of the display panel, and corresponds to a part of a CC' line of FIG. 9. For example, when the data line 106' is disconnected (for example, the data line 106' is divided into a first portion 154 and a second portion 155 due to defects 152 and 153), a cutting line 348 can be generated in a laser manner at the linking portion 246 (FIG. 9) of the auxiliary electrode 204', so that the block portion 218 and the first extension portion 220 of the auxiliary electrode 204' are disconnected, and the first extension portion 220 is electrically floated. The data line 106' may enable, through laser welding, the insulation layer 134 (FIG. 10) to have via holes 150 and 151, and the data line 106' is electrically connected to the first extension portion 220 of the auxiliary electrode 204' by using a welding conductor 3, so as to be repaired. Alternatively, the data line 106' and the first extension portion 220 of the auxiliary electrode 204' are welded in a manner of laser L, so as to form the welding conductor 3. That is, when the data line 106' is disconnected due to the defects 152 and 153, the first portion (for example, an upper portion) 154 of the data line 106' may be electrically connected to the first extension portion 220 of the auxiliary electrode 204' through laser welding; and the auxiliary electrode 204' is electrically connected to the second portion (for example, a lower portion) 155 of the data line 106' through laser welding. Therefore, the first portion (for example, the upper portion) 154 and the second portion (for example, the lower portion) 155 of the data line 106' may be electrically connected. Therefore, a signal can still be transferred from the first portion (for example, the upper portion) 154 of the data line 106' to the second portion (for example, the lower portion) 155 of the data line 106', so that the data line 106' can be repaired.

According to the foregoing embodiments, concepts of this disclosure at least have the following advantages. The slit and the narrow portion of the data line are disposed on a side edge of the pixel electrode, and the auxiliary electrode is disposed below the slit of the data line. Therefore, impact of the voltage of the data line on inclination directions of the liquid crystal molecules of the liquid crystal layer can be reduced. Therefore, crosstalk phenomena can be reduced and a problem of light leakage of the data line can be improved. The auxiliary electrode further includes the linking portion, and can resolve the problem that the data line is disconnected.

Based on the above, the present disclosure is disclosed through the foregoing embodiments; however, these embodiments are not intended to limit the present disclosure. Various changes and modifications may be made by a person of ordinary skill in the art without departing from the spirit and scope of the present disclosure. Therefore, the protection scope of the present disclosure is subject to the appended claims.

What is claimed is:

1. A pixel structure, comprising:
   a first substrate;
   a first scan line, disposed on the first substrate;
   a first pixel, disposed on the first substrate, comprising:
      a first pixel electrode; and
      a first active element, electrically connected to the first pixel electrode;
   an auxiliary electrode, disposed on the first substrate;
   a data line, disposed on the auxiliary electrode and having a first slit, wherein a vertical projection of the auxiliary electrode at least partially overlaps the first slit; and
   an insulation layer, disposed between the data line and the auxiliary electrode.

2. The pixel structure according to claim 1, wherein an overlapping portion of the first slit and the auxiliary electrode is located on at least one side edge of the first pixel electrode.

3. The pixel structure according to claim 1, wherein the slit of the data line extends along an extension direction of the data line.

4. The pixel structure according to claim 1, wherein the data line has a first outer side surface and a second outer side surface opposite to each other, and the vertical projection of the auxiliary electrode is between the first outer side surface and the second outer side surface.

5. The pixel structure according to claim 1, wherein the data line comprises a wide portion and a narrow portion, the narrow portion is adjacent to the wide portion, and the first slit is defined by the narrow portion and the wide portion.

6. The pixel structure according to claim 5, wherein the narrow portion and the wide portion surround the first slit.

7. The pixel structure according to claim 5, wherein the narrow portion is thicker than a thickness of the wide portion.

8. The pixel structure according to claim 5, wherein the data line further comprises a connection portion overlapping the first scan line, and the connection portion is narrower than the wide portion.

9. The pixel structure according to claim 1, wherein the auxiliary electrode has a cutting line, the insulation layer has a via hole, and the data line is electrically connected to the auxiliary electrode through the via hole.

10. The pixel structure according to claim 1, further comprising a second pixel, wherein the first pixel and the second pixel are arranged along a first direction, the second pixel comprises a second pixel electrode and a second active element, the second pixel electrode is electrically connected to the second active element, and the data line is disposed between the first pixel electrode and the second pixel electrode.

11. The pixel structure according to claim 1, further comprising:
   a second scan line; and
   a second pixel;
   wherein both the second pixel and the first pixel are in a first row, the second pixel comprises a second pixel electrode and a second active element, the second pixel electrode is electrically connected to the second active element; and
   wherein the data line further comprises a connection portion and a second slit, the connection portion is connected to the first slit and the second slit, and the vertical projection of the auxiliary electrode at least partially overlaps the second slit.

12. The pixel structure according to claim 1, further comprising:
   a second substrate, located on an opposite side of the first substrate; and
   a liquid crystal layer, located between the first substrate and the second substrate.

13. The pixel structure according to claim 12, further comprising an electrode film located on an inner surface of the second substrate, wherein a first voltage with a first voltage value is applied to the electrode film, a second voltage with a second voltage value is applied to the auxiliary electrode of the pixel structure, and the first voltage value equals to the second voltage value.

14. A display panel, comprising:
   the pixel structure according to the claim 1;
   a second substrate, located on an opposite side of the first substrate; and
   a display medium layer, located between the first substrate and the second substrate.

* * * * *